Aug. 5, 1952 S. W. DENNIS 2,605,730
APPARATUS FOR MAKING CONTAINER CLOSURES
Original Filed Jan. 22, 1947 5 Sheets-Sheet 1
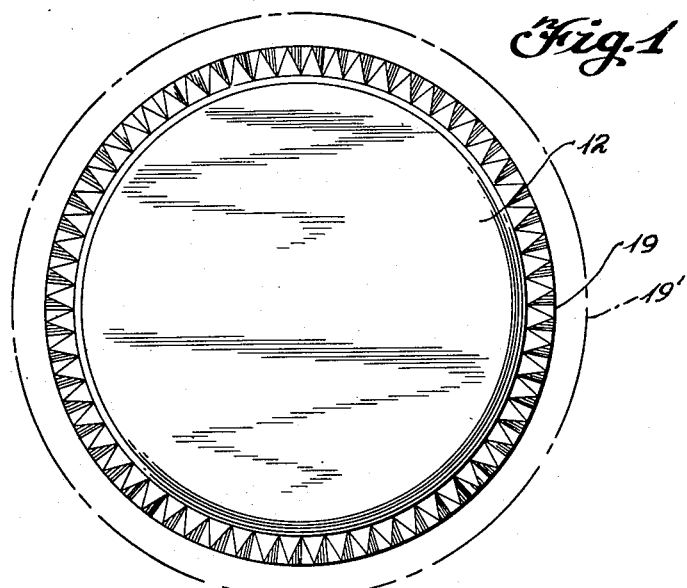
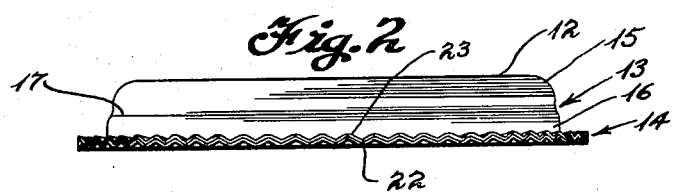
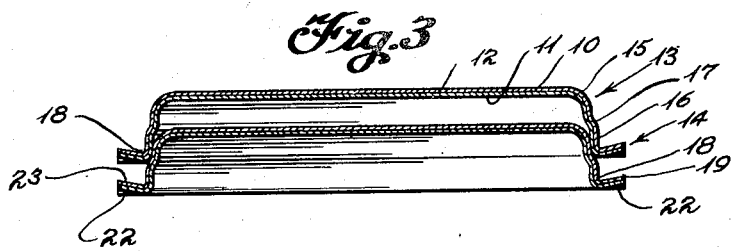
Inventor:
Stanley W. Dennis,

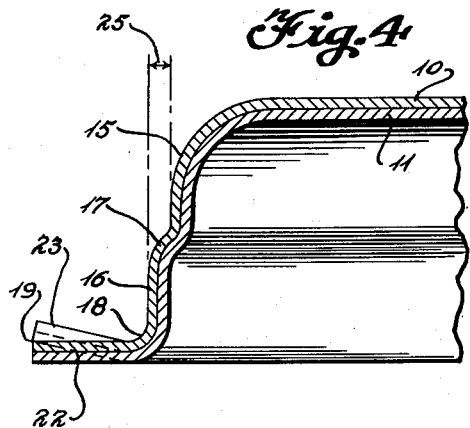
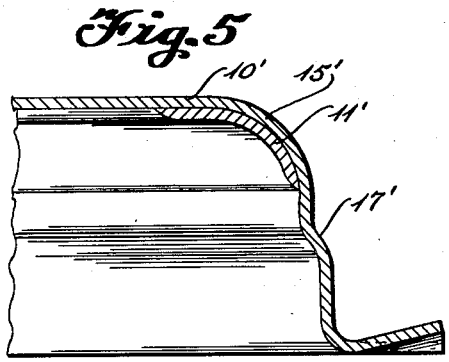
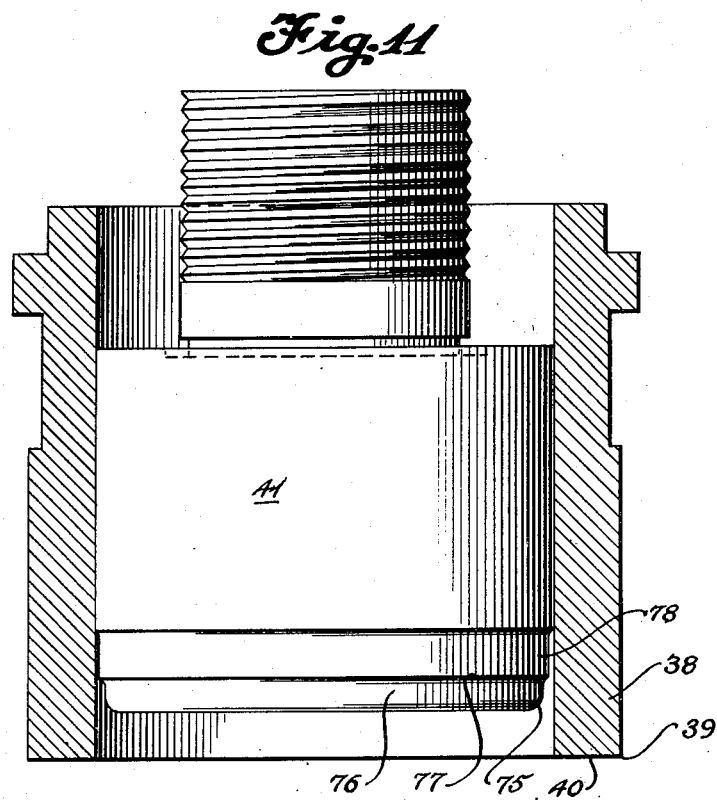

Aug. 5, 1952 S. W. DENNIS 2,605,730
APPARATUS FOR MAKING CONTAINER CLOSURES
Original Filed Jan. 22, 1947 5 Sheets-Sheet 3

Inventor:
Stanley W. Dennis,
By Cushman Darby & Cushman
Attorneys

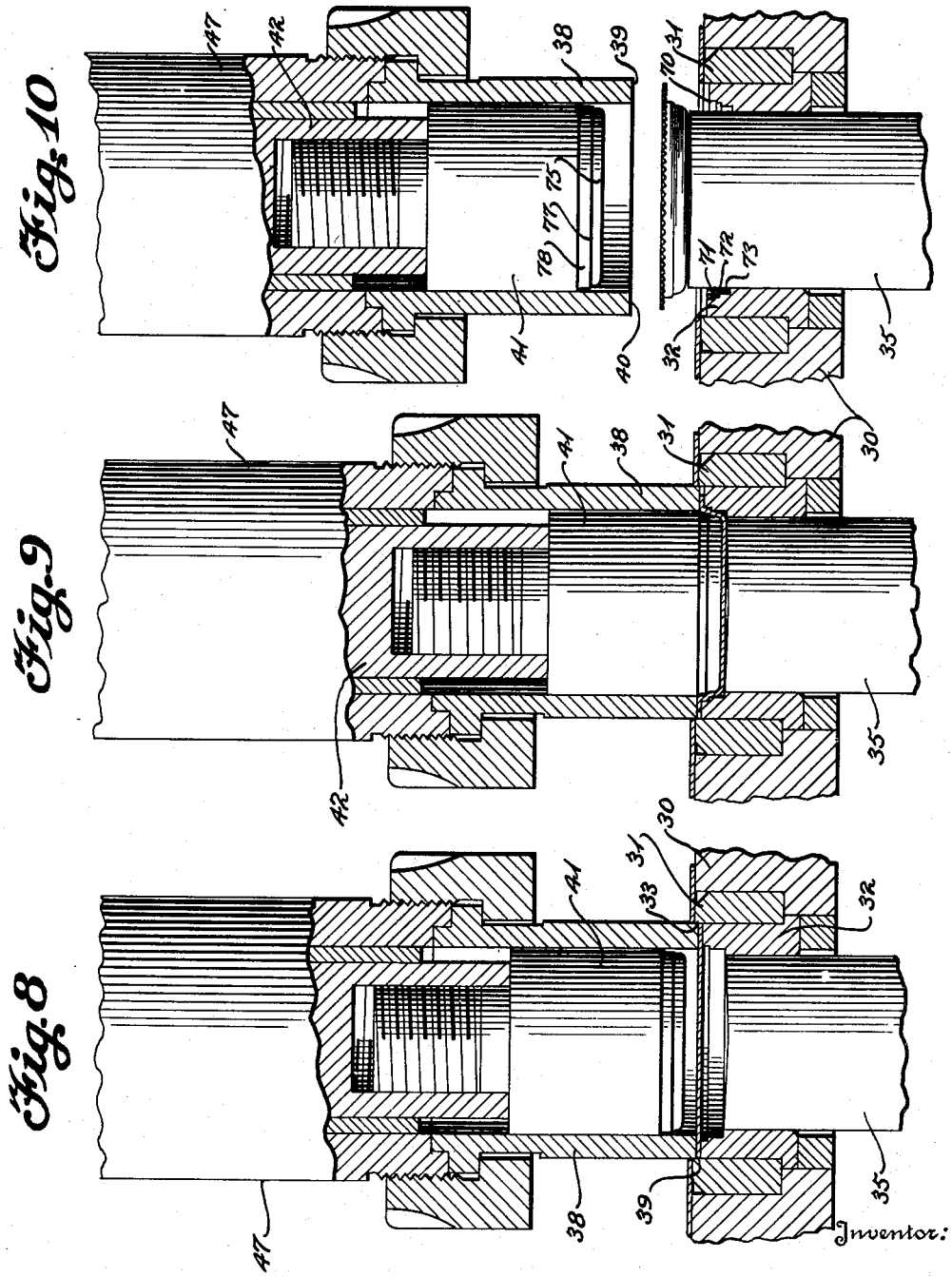

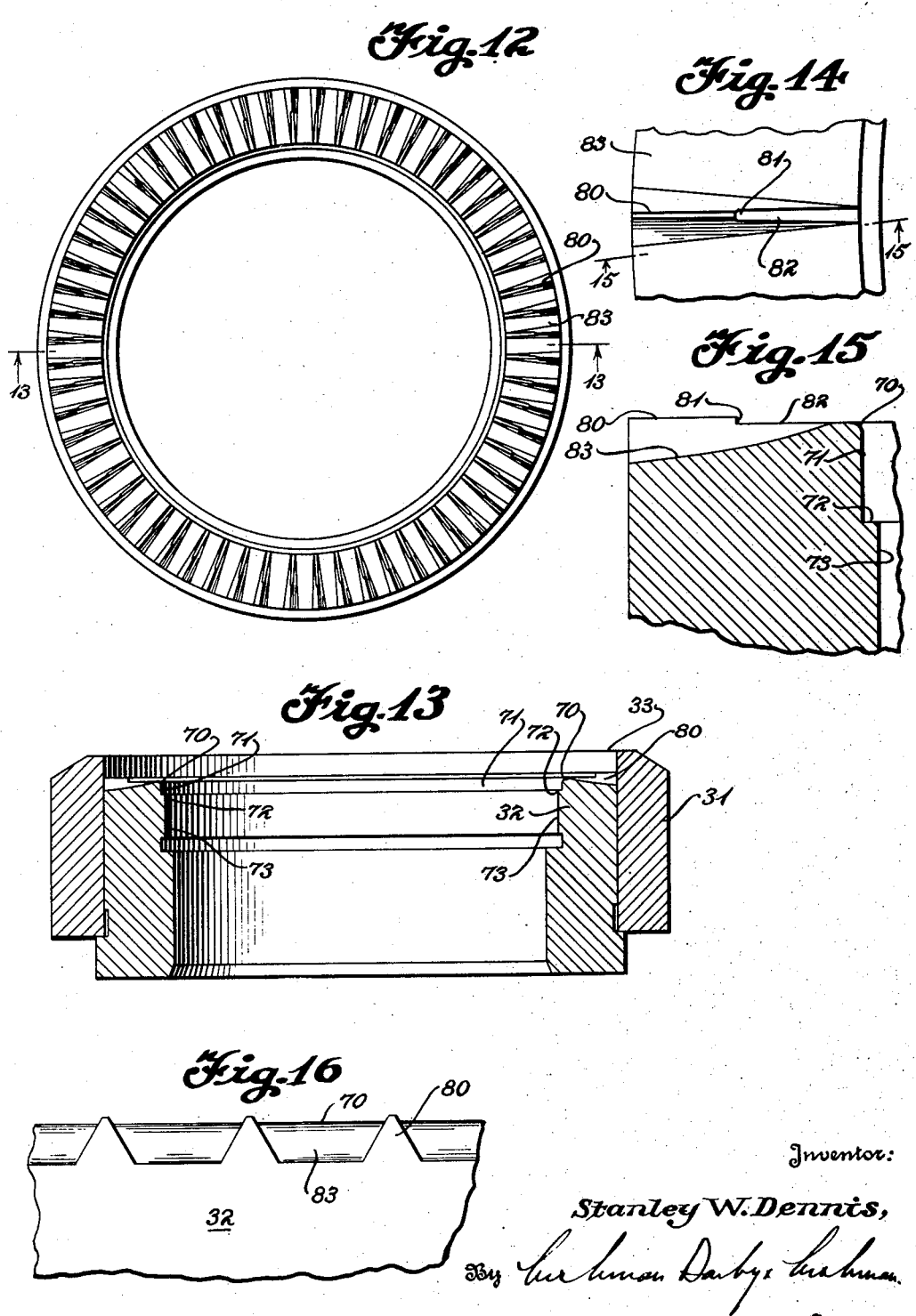

Patented Aug. 5, 1952

2,605,730

UNITED STATES PATENT OFFICE 2,605,730

APPARATUS FOR MAKING CONTAINER CLOSURES

Stanley W. Dennis, Baltimore, Md., assignor to Crown Cork & Seal Company, Inc., Baltimore, Md., a corporation of New York Original application January 22, 1947, Serial No. 723,630, now Patent No. 2,497,870, dated February 21, 1950. Divided and this application March 3, 1948, Serial No. 12,803

5 Claims. (Cl. 113—42)

The present invention relates to new and improved machines for manufacturing the container closures. This application is a division of my prior application, Serial No. 723,630, filed January 22, 1947, now Patent No. 2,497,870, dated February 21, 1950.

More particularly, the closure made by the present invention is an improvement on closures of the type shown, described and claimed in a number of prior patents to G. W. Booth, owned by the assignee of the present application, such as Patents 1,956,209, Reissue 19,422, 1,956,213, 1,956,214, 1,956,215 and 1,956,217. Certain features of the invention, however, as regards apparatus for making the caps, have utility and may be used in connection with caps of other types, as will be apparent from the following description and the appended claims.

An object of the invention is to provide a cap of this type, which is partially preformed, in the sense that the top surface and a portion of the side wall or skirt are well defined and drawn or otherwise pressed to shape, prior to the application of the cap to the bottle, thereby eliminating the necessity of drawing, ironing, or otherwise forming a major portion of the closure skirt from a substantially flat blank, in position on the bottle or other container.

Another object of the invention is to provide preformed closures of this type, in accordance with which the nesting of a plurality of such closures in a stack will be accurately controlled, by the structure of the closure itself, so that the closures will not stick and jam in the closure feeding mechanism, and will be delivered, one by one, to the capping mechanism in an improved manner.

A further object is to provide a preformed closure which may be deposited and centered upon the sealing bead of an associated container with greater facility than the substantially flat disc types previously used, and which will be retained thereon more securely against accidental displacement.

Another object of the invention is to provide structural features in a closure of the type under consideration which materially increase the strength of the closure so that lighter and cheaper metals may be employed in forming the cap.

To these ends, the skirt or side wall of the closure, between the upper and lower ends thereof is provided with a circumferentially continuous outwardly and downwardly projecting shoulder or offset portion, performing the dual function of controlling the nesting of a plurality of caps in a stack and increasing the stiffness and strength of the cap.

A further object of the invention is to provide a partially preformed closure of the type under consideration, in which the skirt is so formed as to facilitate deformation thereof in securing the closure to a bottle. Further, the invention aims to provide a closure having a cap skirt, which, when locked in place on a container, will provide a plurality of regular, evenly spaced, efficient, and neat appearing corrugations or crimps, avoiding the unsightly, irregular, and inefficient crimps which would be provided, were not the structure of the present invention employed.

In accordance with the present invention, the horizontally extending flange, at the lower end of the preformed cap skirt is provided with a plurality of corrugations, extending from the line of junction of the flange with the skirt, outwardly to the outer margin of the flange, and these corrugations have special structural features, as explained below, which facilitate the final locking of the closure to the receptacle.

Another object of the invention is to provide improved machines for making closures having the improved structural features described and claimed in the above mentioned patent, 2,497,870, of which the present application is a division. More particularly, the invention aims to provide a cutting and drawing punch and die assembly which makes it possible to produce a finished cap from a sheet of metal or the like in a single operation. That is to say, the invention provides an apparatus which cuts a blank from a sheet, forms radial score lines in the marginal portion of the blank, draws the top and skirt from the blank, forms a circumferential shoulder in the skirt, forms a horizontally extending flange at the lower edge of the skirt, and provides controlled corrugations in the flange, between the score lines, all in a single operation.

Prior to the present invention, it was thought necessary to employ a separate operation, to shape the corrugations in such a flange, but the invention provides means for and a method of forming such corrugations simultaneously with the drawing of the skirt.

Other and further objects and advantages of the invention will be apparent to those skilled in the art from the following description of certain specific embodiments, shown in the accompanying drawings for purposes of illustration, and described below.

In the drawings

Figure 1 is a plan view of a cap in accordance with the invention.

Figure 2 is a side elevation thereof.

Figure 3 is a vertical, axial section of a pair of such caps, in nested relation, in a stack.

Figure 4 is an enlarged, fragmentary half-section of the cap of Figures 1, 2 and 3.

Figure 5 is a similar section of a modified form.

Figure 8 is an enlarged view of the cutting punch, cutting die, draw punch and draw die, at the conclusion of a cutting operation and just prior to the drawing operation.

Figures 9 and 10 are similar views showing successive operations of the same parts.

Figure 11 is an enlarged section and elevation of the cutting punch and the draw punch of Figures 8–10.

Figure 12 is a plan view of the draw die.

Figure 13 is an axial section of the draw die and cutting die.

Figure 14 is a greatly enlarged plan view of a fragmentary portion of the upper face of the draw die.

Figure 15 is a section taken on line 15—15 of Figure 14, and

Figure 16 is an elevation looking from the left of Figures 14 and 15.

Figure 7:
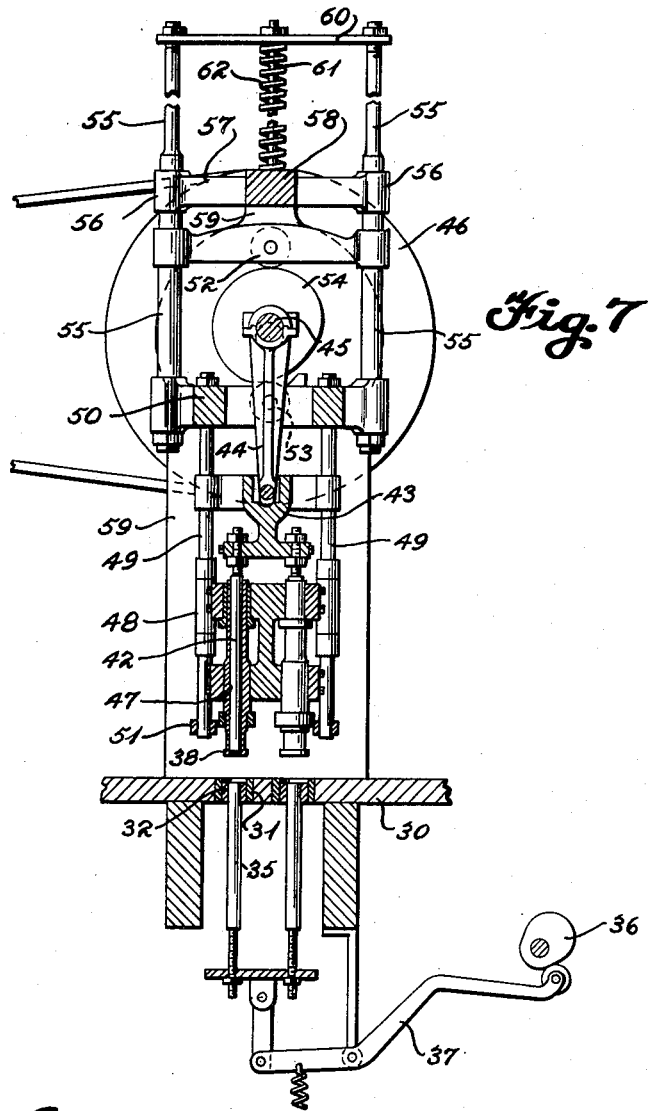
Figure 7 is a somewhat diagrammatic, elevation and partial section of a double acting draw press of the type adapted for use in accordance with the present invention.
Figure 6:
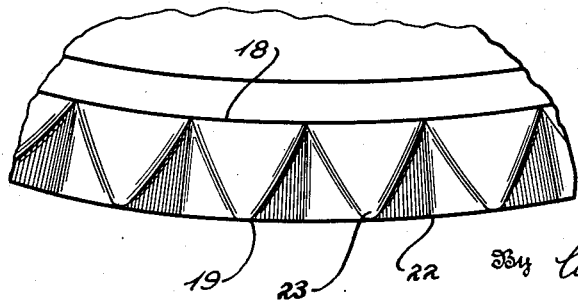
Figure 6 is an enlarged top plan view of the flange of the cap.

The cap of the present invention may be made from a laminated sheet, consisting of a metal layer 10 and a paper layer 11 adhesively united thereto, as explained in the above mentioned patents. The cap comprises a circular top 12, a depending skirt 13, and a horizontally extending flange 14. The skirt 13 includes an upper, rounded portion 15 shaped to conform closely to the standard cross-sectional curve of the locking bead or finish formed on milk bottles of the type of which the caps of the above identified patents are adapted to be used. The skirt 13 also includes a lower, substantially cylindrical portion 16, connected at its upper end to the upper portion 15 by a downwardly and outwardly inclined shoulder or offset portion 17, extending continuously, circumferentially around the skirt.

At its lower end, the skirt joins the flange 14 along a circular circumferentially continuous, non-corrugated line or corner 18.

The flange 14 includes a plurality of horizontal, radially outwardly projecting straight line sections 22, extending from the line of junction 18 with the cap skirt, outwardly to the outer margin 19 of the flange, and a plurality of intermediate corrugations 23. It should be noted that the corrugations are of progressively increasing depth from their inner ends adjacent the line of junction 18, to their outer ends at the outer margin 19 of the flange, and are also of progressively increasing width from their inner ends to their outer ends. Moreover, the corrugations each project upwardly from the plane of the radial, straight line portion 22 of the cap skirt.

The offset portion or shoulder 17, between the upper and lower skirt sections 15 and 16 performs the dual function of increasing the stiffness and strength of the skirt or side wall and controlling the nesting of a plurality of such caps, as indicated in Figure 3. The offset, it may be noted, as indicated by the space 25 (Figure 4), is at least equal to the thickness of the sheet material of which the cap is made.

The preformed corrugations in the flange 14 control the crimping of the flange, when the latter is forced downwardly beneath the locking shoulder of the associated container, with the result that the crimps are equally spaced, completely around the cap and no areas of weakness, which might result from unduly widely spaced crimps, are formed. It will be understood that the line of junction 18 between the flange and the skirt is positioned substantially opposite to the line of maximum diameter of the locking bead on the container, and that the skirt 14 is forced under the locking shoulder, during the application of the closure, as explained in the above patents.

The form of closure shown in Figure 5 is similar to the one just described, and differs therefrom primarily in that the cap is made from a single layer of sheet metal 10', instead of from a laminated, composite sheet of metal and paper. Instead of using an overall layer of paper to provide the sealing contact with the bead surrounding the mouth of the container, a ring 11' of a latex composition, or other sealing compound, is employed. The sealing material, while in fluid condition, is applied to the interior of the cap, in an annular layer, extending around the downwardly curved portion 15' thereof and terminating short of the circumferential shoulder 17'.

Caps of this type nest in a stack, in substantially the same manner as shown in Figure 3, with the result that the layer of sealing composition 11' in one cap is maintained out of contact with all portions of the cap therebelow, and the caps in the stack have no tendency to stick together while being fed to a capping machine.

Referring to Figures 7–16, a preferred form of apparatus for making the closure of the present invention is shown, somewhat diagrammatically. A bed 30 may serve as a support for a plurality of die assemblies, arranged in staggered relation, in the well known manner.

Each assembly comprises a circular cutting die 31 and a circular drawing die 32, mounted interiorly thereof, in fixed position with respect thereto, and with its upper surface spaced below the circular cutting edge 33 of the cutting die (Figures 8–10 and 13). Within the drawing die 32, there is positioned a knock-out spindle 35, adapted for vertical reciprocation under the control of a cam and lever mechanism 36, 37, below the bed 30, as is well understood in the sheet metal drawing art.

Above the table 30, there is a cutter punch 38, having a cutting edge 39, adapted to cooperate with the cutting edge 33 of the cutting die 31, to blank out circular discs when the punch descends. The cutter punch 38 is provided with a plane, annular lower face 40, adapted to clamp the marginal portion of the disc upon the upper surface of the draw die, to act as a draw ring, as hereinafter explained.

A draw punch 41, mounted for vertical movement interiorly of the cutter punch 38, is threaded upon an elongated shaft 42, having its upper end connected to a vertically reciprocating head carrying a plurality of similar assemblies, arranged in staggered relation, as is well understood in the art.

The head 43 has a plurality of laterally extending guiding arms, embracing rods 49, hereinafter described, and is connected by a pitman 44 to a crank or eccentric on the main drive shaft 45 of the machine, the latter carrying a fly wheel 46, driven by a plurality of V-belts or the like from a suitable source of power. Vertical reciprocating movements are thus imparted to the head and the punches 41 by rotation of the shaft 45.

The cutting punch 38 is connected to the lower end of a sleeve 47, surrounding the punch carrying shaft 42, and having its upper end clamped within the interior bore of a bracket 48, having arms provided with vertical bores embracing the vertically extending rods 49, the latter being carried at their upper ends by a cam following frame 50, and guided at their lower ends in suitable fixed socket elements 51, or the like.

The cam following frame comprises upper and lower horizontal members, upon which are mounted rollers 52 and 53, in engagement with a cam 54, fast on the shaft 45. Vertically extending rods 55, connecting the upper and lower members, are guides in hollow bosses 56 at the ends of stationary arms 57, carried by a heavy bridge member 58, connected to the main upstanding frames 59 of the machine. The upwardly extending portions of the vertical rods 55, above the fixed arms 57 are connected by a cross-plate 60, having a central aperture loosely receiving an upstanding rod 61 carried by the bridge member 58, and about which a heavy coil compression spring 62 is held, confined between the bridge 58 and the plate 60 and exerting force in an upward direction upon the cam following frame, thereby serving in part at least to counterbalance the weight of the frame and the other parts.

It will be understood that the relative movements of the sleeve 47 carrying the cutting die 38 and the shaft 42 carrying the draw punch 41 will be controlled by the shape of the cam 54 and its relation to the crank on the shaft 45.

The details of construction of the draw die and draw punch are of importance. The die 32 includes a circumferentially continuous drawing shoulder 70, and inner cylindrical drawing surface 71, an inwardly projecting shoulder 72, and a cylindrical surface of reduced diameter 73. These surfaces cooperate with similar surfaces on the draw punch 41. The latter includes a rounded end face 75, a cylindrical portion of reduced diameter 76, a shoulder 77, and an upper cylindrical portion of enlarged diameter 78. It will be apparent that these surfaces cooperate to form the rounded corner and upper skirt portion 15 of the cap, the shoulder portion 17, and the lower skirt portion of enlarged diameter 16, as the draw punch forces the central portion of the disc into the draw die.

The upper end face of the draw die 32 includes a plurality (e. g. sixty) of radially extending upwardly projecting scoring ribs 80, spaced equally about the circumference thereof and extending from the outer margin of the die, inwardly a short distance, substantially equal to the distance of the radial contraction of the outer circumference of the blank during a drawing operation as hereinafter explained, at which point 81 the tops of the ribs are relieved, providing flats 82 disposed at the same elevation as the draw shoulder 70.

Intermediate the ribs 80, the upper face of the draw die 32 is cut away as at 83 to provide recesses having downwardly and outwardly inclined bottoms.

In accordance with the method of the present invention and during the operation of the apparatus just described, a blank of sheet metal or a laminated blank of metal and paper is positioned above the cutting die 31. As the combined cutter punch and draw ring 38 descends, it cuts out a circular disc of metal, between the cutting edges 33 and 39, and positions the same upon the upper face of the draw die 32, with the margin thereof clamped and somewhat scored along radial lines between the upper edges of the ribs 80 and the lower plane face 40 of the cutter punch 38, in the position shown in Figure 8. The metal between these radial lines of clamping is unconfined in one axial direction by the recesses 83, but is backed up in the other direction by the plane end face 40 of the cutter punch.

Next, the draw punch 41 descends and forces the central portion of the disc into the draw die 32, thereby forming the side wall or skirt of the closure, including the upper and lower portions 15 and 16 and the intermediate shoulder 17.

During this action, the marginal portion of the blank is drawn radially inwardly or contracted, and its circumference decreased, from the dotted line 19' to the full line margin 19 of Figure 1. This circumferential contraction, with spaced radial score lines confined between the ribs 80 and the adjacent plane face 40 of the cutter punch, causes the metal in the portions between the lines of clamping to bend or buckle into the recesses 83, since these portions are prevented from moving in the other direction by the continuous plane end face of the cutter punch. As the contraction continues, the projection into the recesses 83 likewise continues, until, at the completion of the operation, the corrugations 23 are formed, and the margins of the flange move onto the relieved portions or flats 82 of the ribs 80.

Thus, the flange of the skirt is regularly and evenly corrugated, without employing a separate operation to stamp the hills and valleys therein. It will be appreciated that mating flutes corresponding to the desired corrugations could not be formed on the upper and lower surfaces of the cutter punch and draw die, respectively, since such flutes on the cutter punch would make it substantially impossible to sharpen the cutting edge 39 thereof. The present invention, therefore, provides a method of and means for forming regular, even, controlled corrugations in a cap flange, as an incident to a cap drawing operation, and in the absence of a special punching or pressing operation.

At the conclusion of the cap drawing and flange corrugating operation, just described, the draw punch 41 and the cutter punch 38 are raised, in sequence or simultaneously, and the knock-out spindle 35 is then moved upwardly, to remove the completed cap from the draw die 32. In machines of the present class, the beds 30 are usually mounted on an inclined plane, so that the caps drop by gravity therefrom, when released by the knock-out mechanism.

It should be understood that the present invention is not limited to the details as to cap structure or method of and apparatus for making the same described above and shown for purposes of illustration in the accompanying drawings, but includes all modifications coming within the scope of the appended claims and their equivalents.

I claim:

1. An apparatus for making a container closure having a top, a depending skirt and an outwardly projecting corrugated flange at the lower edge thereof, comprising a pair of annular members adapted to clamp the marginal portion of a circular blank therebetween, one member having a plane surface engaging one surface of said marginal portion and the other having a continuous, uninterrupted, circular, internal draw shoulder and an end face shaped to provide a plurality of circumferentially spaced, radial clamping and scoring ribs engaging correspondingly spaced radial lines of the other surface of said marginal portion, and intermediate recesses; and means for simultaneously drawing the central portion of the disc axially over said shoulder and contracting said marginal portion radially to form the top, skirt and flange of the closure, said radial contraction serving to buckle the marginal portion into said recesses between the score lines to form corrugations in the flange.

2. An apparatus for making a container closure having a circular top, a depending skirt and a radially extending flange at the lower edge thereof, comprising an annular draw die having a continuous, uninterrupted circular internal drawing shoulder, a cylindrical draw surface inwardly thereof and a radially outwardly extending end face adapted to support a circular blank, said face adjacent the circumference thereof being shaped to provide a plurality of circumferentially spaced, radially extending ribs and intermediate recesses, said ribs having their inner end portions at the same elevation as and merging with said continuous drawing shoulder; an annular member having a plane radial face adapted to clamp the marginal portion of the blank upon said ribs; and a draw punch for forcing the central portion of the blank into the draw die and simultaneously to contract the marginal portion of the blank radially and to force the portions thereof intermediate the ribs into said recesses, to form upwardly deflected corrugations in the flange.

3. A draw die for use in making container closures, comprising a continuous, uninterrupted annular, internal draw shoulder, an interior, cylindrical draw surface and a radially extending end face comprising a plurality of axially projecting, circumferentially spaced, radially extending ribs having the radially inner end portions of their tops at substantially the elevation of, and merging with, said shoulder, and a plurality of intermediate recesses having their bottoms tapering downwardly and outwardly from said shoulder.

4. A draw die for use in making container closures, comprising a continuous, uninterrupted annular, internal draw shoulder, an interior, cylindrical draw surface and a radially extending end face comprising a plurality of axially projecting, circumferentially spaced ribs extending radially outwardly substantially from said shoulder to the outer circumference of the end face, said ribs having their tops at substantially the elevation of said shoulder throughout an inner portion of their lengths and at a higher elevation adjacent the periphery of said face, and intermediate recesses between the ribs having bottoms inclined downwardly and outwardly from the shoulder toward said periphery.

5. An apparatus for making container closures, comprising a cutting die having an internal annular cutting edge, a draw die having an end face positioned axially inwardly from said edge, and a draw punch cooperating with said draw die, said draw die comprising a continuous, uninterrupted annular draw shoulder, a pair of cylindrical internal drawing surfaces of different diameters connected by an intermediate shoulder, and a radially extending end face comprising a plurality of axially projecting, circumferentially spaced, radially extending ribs having the inner ends of their tops at the same elevation as, and merging with, said shoulder, and a plurality of intermediate recesses having their bottoms merging with said shoulder at their inner ends and inclined downwardly and outwardly, said draw punch having a pair of external drawing surfaces of different diameters connected by an intermediate shoulder.

STANLEY W. DENNIS.

REFERENCES CITED

The following references are of record in the file of this patent:

UNITED STATES PATENTS

| Number | Name | Date |
| --- | --- | --- |
| 368,526 | Fowler | Aug. 16, 1887 |
| 448,748 | Comings | Mar. 24, 1891 |
| 613,936 | Painter | Nov. 8, 1898 |
| 1,029,333 | Adriance | June 11, 1912 |
| 2,186,519 | Buono | Jan. 9, 1940 |
| 2,371,581 | Goodwin | Mar. 13, 1945 |
| 2,497,870 | Dennis | Feb. 21, 1950 |